United States Patent
Semmandampalayam et al.

(10) Patent No.: US 11,474,849 B2
(45) Date of Patent: Oct. 18, 2022

(54) DISTRIBUTION OF APPLICATIONS AMONG MACHINES IN A CLOUD

(71) Applicant: Wal-Mart Apollo, LLC., Bentonville, AR (US)

(72) Inventors: Ponsankar Shanmugam Semmandampalayam, Cupertino, CA (US); Ruchitkumar Shah, Fremont, CA (US); Manoharreddy Vummadi, Fremont, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 293 days.

(21) Appl. No.: 16/720,385

(22) Filed: Dec. 19, 2019

(65) Prior Publication Data

US 2021/0191744 A1 Jun. 24, 2021

Related U.S. Application Data

(63) Continuation of application No. 15/883,058, filed on Jan. 29, 2018, now Pat. No. 10,552,198.

(51) Int. Cl.
  *G06F 9/455* (2018.01)
  *G06F 9/50* (2006.01)
  (Continued)

(52) U.S. Cl.
  CPC ........ *G06F 9/45558* (2013.01); *G06F 9/5083* (2013.01); *H04L 43/10* (2013.01);
  (Continued)

(58) Field of Classification Search
  CPC ......... G06F 9/5083; G06F 2009/45595; G06F 2209/5011; G06F 9/45558; H04L 43/10; H04L 67/10; H04L 67/30
  (Continued)

(56) References Cited

U.S. PATENT DOCUMENTS 8,875,160 B2 * 10/2014 Hunt .................. G06F 8/71
  718/1
9,553,951 B1    1/2017 Nguyen et al.
  (Continued)

OTHER PUBLICATIONS

Gunupati et al., "Distributed Controller for Load Balancing with VM Migration", 2019 4th International Conference on Information Systems and Computer Networks (ISCON) GLA University, Nov. 21-22, 2019, IEEE, pp. 488-495. (Year: 2019).*
  (Continued)

*Primary Examiner* — Kenneth Tang
(74) *Attorney, Agent, or Firm* — Duane Morris LLP; Manita Rawat (57) ABSTRACT

A system includes at least one processor configured to host virtual machines in a cloud. Each virtual machine executes a plurality of instances of a first application. Each virtual machine also executes a distributor. The distributor is configured for accessing a profile of the application and a distribution of the first application, wherein the distribution identifies a respective first number of instances of the first application to execute in each respective virtual machine. After launch of the first application, the distributor is configured for computing an updated distribution that includes a respective second number of instances of the first application to execute in each respective virtual machine. The distributor is also configured for determining whether the second number of instances is different from the first number of instances. The distributor is configured for storing the updated distribution in a database in response to receiving a lock for accessing the distribution.

20 Claims, 8 Drawing Sheets

(51) Int. Cl.
*H04L 67/10* (2022.01)
*H04L 43/10* (2022.01)
*H04L 67/30* (2022.01)

(52) U.S. Cl.
CPC .... *H04L 67/10* (2013.01); *G06F 2009/45595* (2013.01); *G06F 2209/5011* (2013.01); *H04L 67/30* (2013.01)

(58) Field of Classification Search
USPC .......................................................... 718/1
See application file for complete search history.

(56) References Cited

U.S. PATENT DOCUMENTS

| | | | | |
|---|---|---|---|---|
| 10,979,318 | B2* | 4/2021 | Meyer | G06N 20/00 |
| 2006/0271931 | A1* | 11/2006 | Harris | G06F 9/544 |
| | | | | 718/1 |
| 2007/0011667 | A1* | 1/2007 | Subbiah | G06F 9/45504 |
| | | | | 717/148 |
| 2014/0040343 | A1* | 2/2014 | Nickolov | H04L 67/1029 |
| | | | | 709/201 |
| 2016/0142336 | A1* | 5/2016 | Udupi | G06F 9/5077 |
| | | | | 709/226 |
| 2017/0220374 | A1* | 8/2017 | Beveridge | G06F 9/45558 |
| 2017/0364380 | A1* | 12/2017 | Frye, Jr. | G06F 8/65 |
| 2019/0068622 | A1* | 2/2019 | Lin | H04L 63/1441 |
| 2021/0004262 | A1* | 1/2021 | Gupta | G06F 9/4856 |

OTHER PUBLICATIONS

Patel et al., U.S. Appl. No. 15/888,147, filed Jan. 30, 2018, re:Figures as Filed with the Application. 4 pages.

Padala et al., "Scaling of Cloud Applications Using Machine Learning," VMWare Technical Journal, accessed on Jan. 11, 2018 at https:labs.vmware.com/vmtj/scaling-of-cloud-applications-using-machine-learning. 17 pages.

* cited by examiner

DISTRIBUTION OF APPLICATIONS AMONG MACHINES IN A CLOUD

CROSS-REFERENCE RELATED CASES

This application is a continuation of U.S. patent application Ser. No. 15/883,058, filed on Jan. 9, 2018, the entirety of which is incorporated herewith.

TECHNICAL FIELD

This disclosure relates generally to computers and, more specifically, to the distribution of application processes among plural machines in a cloud computing environment.

BACKGROUND

At least some known cloud computing systems provide access by multiple clients to shared system resources and services. Cloud computing systems can share resources to achieve common operating environments, for simplified user support. The shared resources can be rapidly provisioned and/or scaled with reduced management effort. However, the distribution may not be balanced across, for example, data centers and cloud machines. Moreover, the distribution may not be efficient and/or may require a substantially large capacity.

SUMMARY

The embodiments described herein enable the intelligent distribution and management of a plurality of application(s) in a given pool of machines, such as virtual machines. For example, in some embodiments, a system is provided that includes at least one processor configured to host a plurality of virtual machines in a cloud. Each virtual machine is configured to execute a plurality of instances of a first application. Each virtual machine is also configured to execute a distributor, and the distributor is configured for accessing a profile of the application and a distribution of the first application, wherein the distribution identifies a respective first number of instances of the first application to execute in each respective virtual machine. After launch of the first application, the distributor is configured for computing an updated distribution that includes a respective second number of instances of the first application to execute in each respective virtual machine. The distributor is also configured for determining whether the second number of instances is different from the first number of instances. The distributor is configured for storing the updated distribution in a database in response to receiving a lock for accessing the distribution.

In other embodiments, a method is provided that includes hosting a plurality of virtual machines in a cloud, via at least one processor, and configuring each virtual machine to execute a plurality of instances of a first applications, wherein each virtual machine is configured to execute a distributor. A profile of the application is accessed and a distribution of the first application occurs, via the distributor. The distribution identifying a respective first number of instances of the first application to execute in each respective virtual machine. The method includes computing an updated distribution that includes a respective second number of instances of the first application to execute in each respective virtual machine, after launch of the first application and determining whether the second number of instances is different from the first number of instances. The method further includes storing the updated distribution in a database in response to receiving a lock for accessing the distribution.

In yet other embodiments, a non-transitory, computer-readable storage medium is provided that includes executable instructions that, when executed by one or more processors, cause the processors to host a plurality of virtual machines in a cloud. Each virtual machine is configured to execute a plurality of instances of a first application. Each virtual machine is also configured to execute a distributor, and the distributor is configured for accessing a profile of the application and a distribution of the first application, wherein the distribution identifies a respective first number of instances of the first application to execute in each respective virtual machine. After launch of the first application, the distributor is configured for computing an updated distribution that includes a respective second number of instances of the first application to execute in each respective virtual machine. The distributor is also configured for determining whether the second number of instances is different from the first number of instances. The distributor is configured for storing the updated distribution in a database in response to receiving a lock for accessing the distribution.

DETAILED DESCRIPTION

This description of the exemplary embodiments is intended to be read in connection with the accompanying drawings, which are to be considered part of the entire written description.

This disclosure provides a system that intelligently distributes and manages a plurality of application(s) in a given pool of machines. As discussed herein, the general term "machines" can refer to virtual machines (VMs), "bare metal" computer processors running a native operating system, or any combination of the two. The system provides better utilization of capacity from a given pool of VMs, by dynamically re-distributing application(s) when a VM is added or removed, or when a loading metric of one or more of the VMs exceeds a predetermined maximum threshold or falls below a predetermined minimum threshold. The system can auto-scale the application by adding or removing an instance of the application, when the application can operate more efficiently by using more or less capacity. The automatic scaling can substantially reduce application configuration and maintenance effort.

Figure 1:
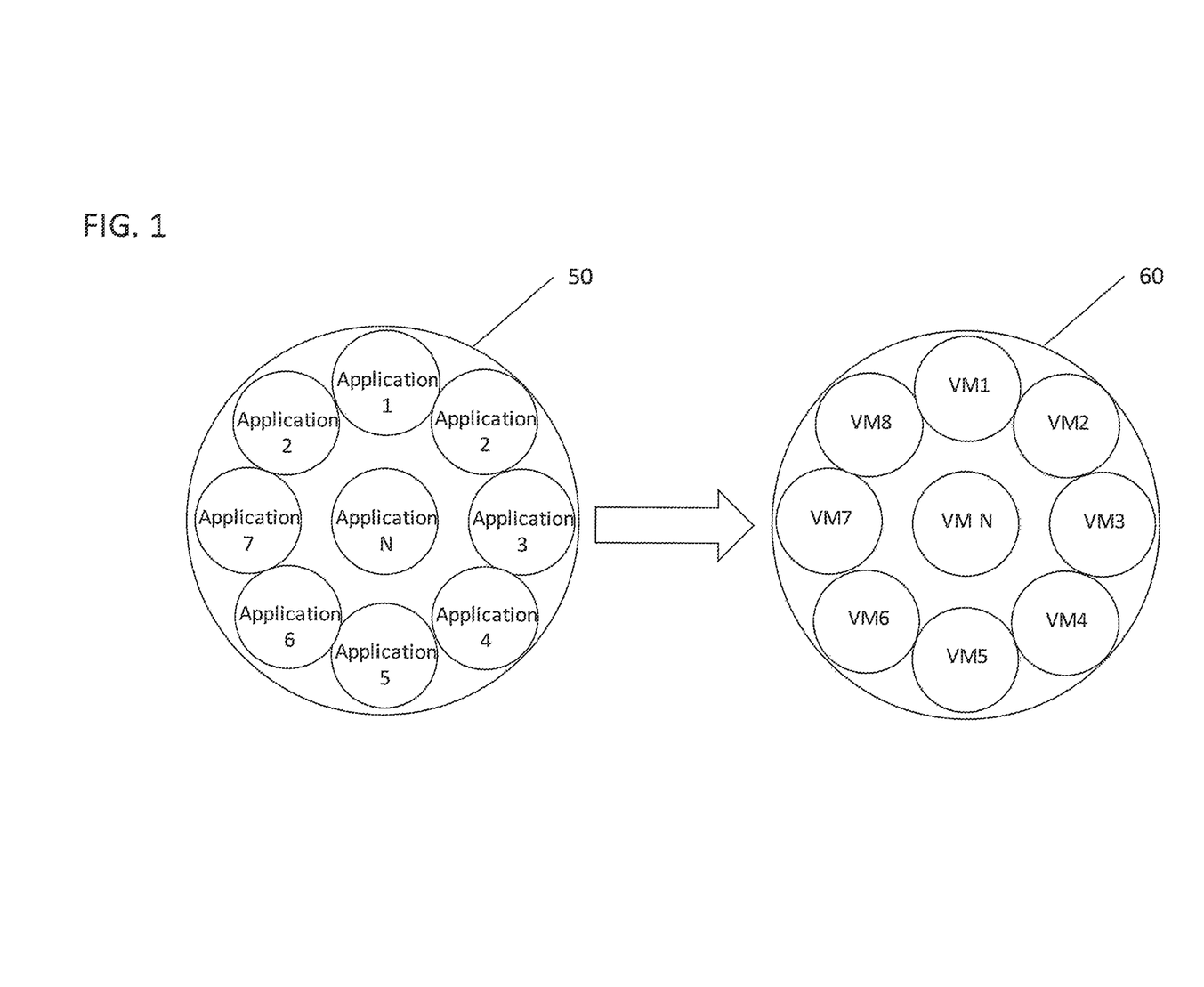
FIG. 1 illustrates an exemplary set of applications in accordance with some embodiments of the present disclosure.

FIG. 1 is a diagram showing a set 50 of applications (Applications 1-N) to be distributed and an available pool 60 of resources VM1-VMN.

Figure 2:
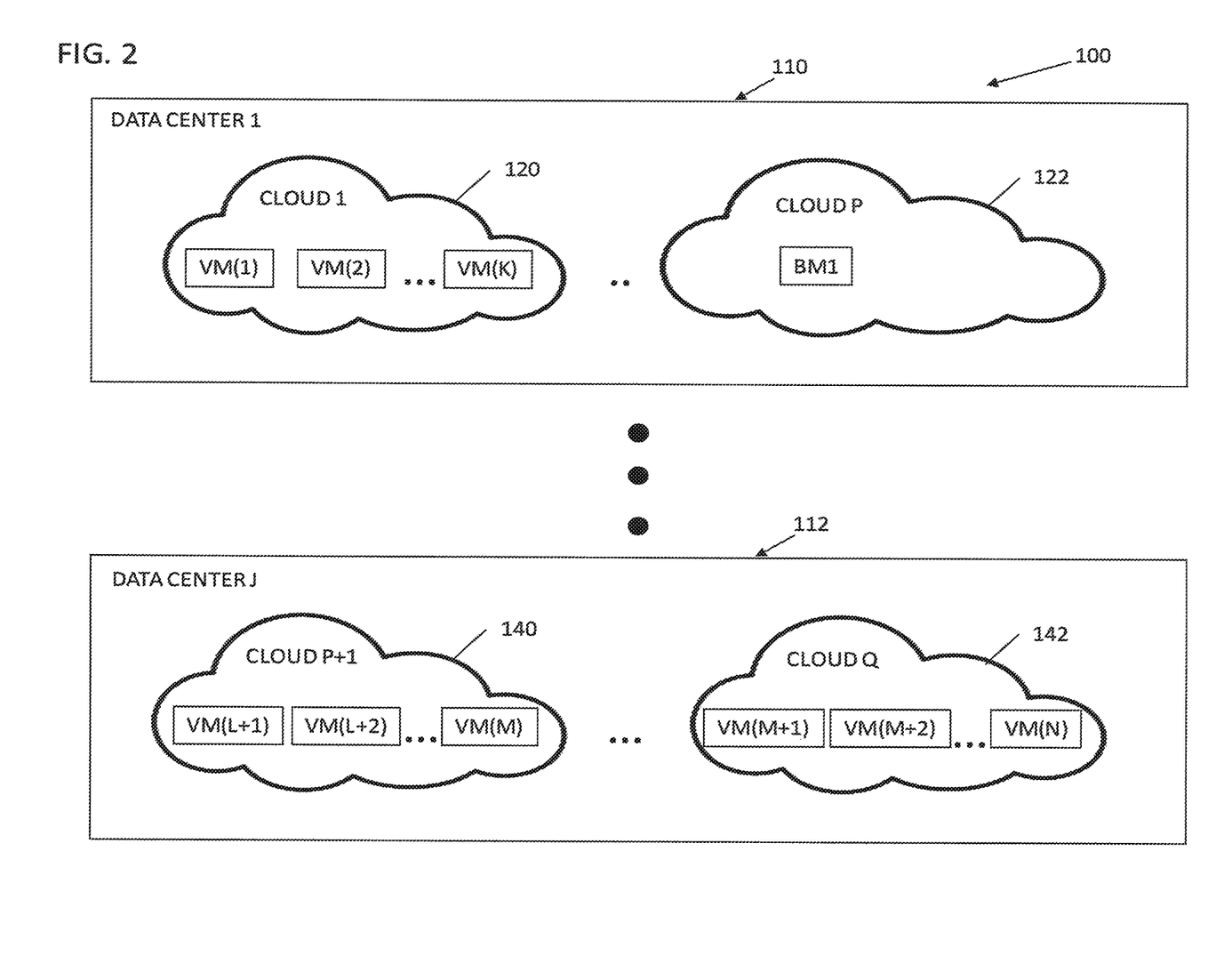
FIG. 2 illustrates an exemplary system that may be used for hosting the applications shown in FIG. 1, in accordance with some embodiments of the present disclosure.

FIG. 2 is a block diagram of a cloud computing system 100 for hosting the applications 50 of FIG. 1. The system 100 can include one or more data centers (DC). In the example of FIG. 1, the DC include data center 1 (110) to data center J (112), where J can be any integer greater than zero. Each data center 110, 112 can have one or more clouds 120, 122, 140, 142. Each cloud 120, 122, 140, 142 can include a computer or a local area network (LAN). Each cloud can have a respective Internet address.

For example, DC 110 has clouds 1 to P (120 to 122). Cloud 120 has a plurality of VMs, including VM(1) to VM(K). Cloud 120 has a dynamic configuration, allowing VMs to be added and removed. Cloud 122 has a bare metal processor BM1 running a native operating system. Cloud 122 has a static configuration. For purpose of distributing applications using the methods described below, a cloud having a static configuration (e.g., cloud 122) is treated like a single VM. Data center 112 has a plurality of clouds 140-142. Cloud 140 has VMs including VM(L+1) to VM(M). Cloud 142 has VMs including VM(M+1) to VM(N).

A data center 110 can have at least one processor for hosting one or more VMs. In data center 110, cloud 120 may have a first processor including VM(1) to VM(K). The at least one processor in data center 110 further comprises a second cloud 122 including second processor BM1, which can host the application on a native operating system. Computing the second number—an updated number of instances of each application—further comprises computing a respective (third) number of instances of the application to execute in the second processor BM1. The updated distribution includes the (third) number of instances of the application to execute in the second processor BM1.

The distribution method treats a bare metal machine the same way as a virtual machine for purpose of determining how many instances of the application to run on each machine. In the example of the distribution method below, unless expressly stated otherwise, reference to a virtual machine (VM) or machine is applicable to a virtual machine or a bare metal machine.

Figure 3:
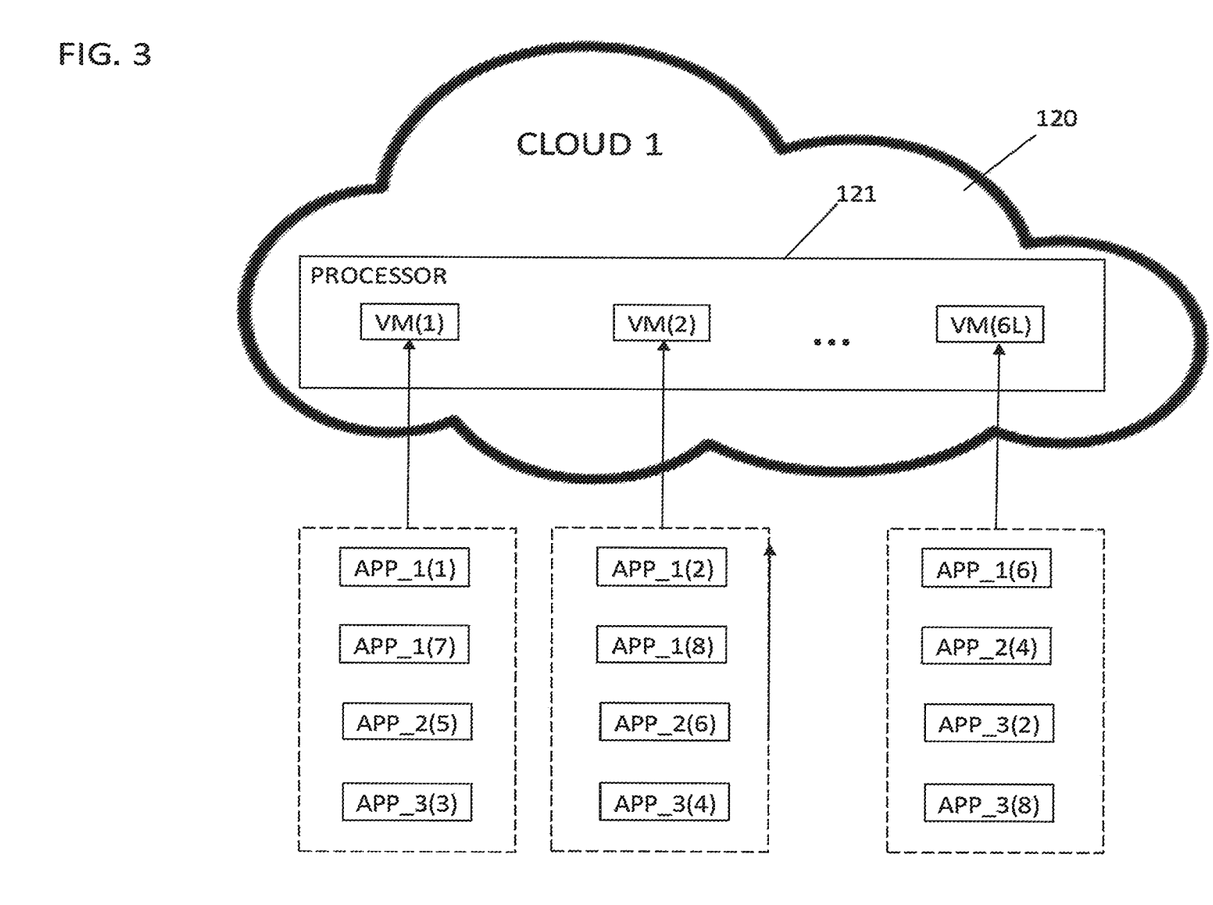
FIG. 3 illustrates an exemplary cloud that may be used with the system shown in FIG. 2, in accordance with some embodiments of the present disclosure.

FIG. 3 is a schematic diagram of the cloud 120 with an exemplary set of applications executing on the VMs [VM(1) to VM(L)]. The example of FIG. 3 has six VMs, but any number of VMs can be used. In FIG. 3, the six VMs collectively execute three applications, with eight instances of each application, for a total of 24 instances of applications running on cloud 120. This is only exemplary, and the cloud 122 can run any number of instances of an application to improve efficiency as appropriate for any configuration and loading scenario.

Cloud 120 has at least one processor 121 configured to host a plurality of virtual machines VM(1) to VM(L) in a cloud. Each virtual machine VM(1) to VM(L) is configured to execute a plurality of instances e.g., APP_1(1) to APP_1(8) of a first application. (FIG. 3 omits VM(3) to VM(5) for ease of illustration, and thus omits the instances APP_1(3) to APP_1(5) executing on the omitted VMs.) In the example of FIG. 3, the at least one processor 121 is configured to execute a plurality of applications APP_1, APP_2 and APP_3, and the first application APP_1 is included in the plurality of applications. APP_2 has eight instances, of which only APP_2(4) to APP(6) are shown, the remaining instances running on the VMs omitted from FIG. 3. APP_3 has eight instances, of which only APP_3(2) to APP_3(4) and APP_3(8) are shown, the remaining instances running on the VMs omitted from FIG. 3. Each of the plurality of applications has a respective profile specifying a respective scale thereof.

In some embodiments, processor 121 is an execution unit, or "core," on a microprocessor chip. In some embodiments, processor 121 may include a processing unit, such as, without limitation, an integrated circuit ("IC"), an ASIC, a microcomputer, a programmable logic controller ("PLC"), and/or any other programmable circuit. Alternatively, processor 121 may include multiple processing units (e.g., in a multi-core configuration). The above examples are exemplary only, and, thus, are not intended to limit in any way the definition and/or meaning of the term "processor." In some embodiments, processor 121 may be part of, for example, a computing device or computer (not shown) that includes a hardware unit (not shown) and software (not shown) that can run on the hardware unit such that various applications or programs can be executed on the hardware unit by way of software. In some embodiments, the functions of software can be implemented directly in the hardware unit, e.g., as a system-on-a-chip, firmware, field-programmable gate array ("FPGA"), etc. In some embodiments, the hardware unit can includes one or more processors, such as processor 121.

The hardware unit can also include a system memory (not shown) that is coupled to processor 121 via a system bus (not shown). The memory can be a general volatile RAM. For example, the hardware unit can include a 32 bit microcomputer with 2 Mbit ROM and 64 Kbit RAM, and/or a few GB of RAM. The memory 232 can also be a ROM, a network interface (NIC), and/or other device(s). In some embodiments, the computing device can also include at least one media output component or display interface (not shown) for use in presenting information to a user. The display interface can be any component capable of conveying information to a user and may include, without limitation, a display device (not shown) (e.g., a liquid crystal display ("LCD"), an organic light emitting diode ("OLED") display, or an audio output device (e.g., a speaker or headphones)). In some embodiments, the computing device can output at least one desktop (not shown). The desktop can be an interactive user environment provided by an operating system and/or applications running within the computing device, and can include at least one screen or display image (not shown). The desktop can also accept input from a user in the form of device inputs, such as keyboard and mouse inputs. In some embodiments, the desktop can also accept simulated inputs, such as simulated keyboard and mouse inputs. In addition to user input and/or output, the desktop can send and receive device data, such as input and/or output for a FLASH memory device local to the user, or to a local printer.

In the example of FIG. 3, all of the instances of applications APP_1, APP_2, and APP_3 run in a single cloud 120. This is only exemplary, and instances of any given application can run in plural clouds in a single data center, or plural clouds in each of a plurality of data centers.

According to some embodiments, the system 100 includes a plurality of "smart resources" As used herein, a smart resource is a virtual entity which can include data centers and/or clouds. In some embodiments, a smart resource can decide which data centers and clouds will be used to provision each of the applications dynamically. A smart resource configuration can be static or dynamic. In case of a bare-metal entity, the configuration can be static. For clouds, the configuration can be dynamically rendered by a distributor, described below. The distributor receives a profile of a smart resource as an input and distributes application(s) dynamically to improve efficiency.

Example

In the example below, a smart resource can be defined in JavaScript Object Notation (JSON) format as shown below. Application owners are encouraged to model with multiple data centers and clouds. Below example has, 2 data centers: "dc1" and "dc2".
2 clouds per data center. (dc1_1, dc1_2, dc2_1, dc2_2)

```
{
   "dc2" : {
      "dc2_1" : List of IP address *dynamic fetch*,
      "dc2_2" : List of IP address *dynamic fetch*
   },
   "dc1" : {
      "dc1_1" : List of IP address *dynamic fetch*,
      "dc1_2" : List of IP address *dynamic fetch*
   }
}
```

The application owner inputs an application scale and profile for each application. The scale is a distribution factor selected by the administrator and included in the profile of an application. The application owner selects the scale for each application. The system allows the application owner to select from a predetermined set of scale options. The scale options are relative to each other. The scale is relative term to the availability of VMs in the s-resource. Each scale is associated with a respective predetermined percentage. Given a total number of VMs available in the data center(s) and cloud(s) that can host an application, the application is assigned a number of instances equal to the number of VMs times the percentage associated with the scale.

For example, in one embodiment, the available scales include: X2S(10%), XS(25%), S(50%), M(75%), L(100%), XL(150%), XXL(200%). This is just one non-exclusive example, and other embodiments can provide fewer or more scales. Given a number NVM of VMs, the number of instances of any application is determined as shown in Table 1.

TABLE 1

| Scale | Number of Instances | No. Instances for NVM = 32 |
| --- | --- | --- |
| X2S(10%) | 0.1*NVM | 4 |
| XS(25%) | 0.25*NVM | 8 |
| S(50%) | 0.5*NVM | 16 |
| M(75%) | 0.75*NVM2 | 24 |
| L(100%) | NVM | 32 |
| XL(150%) | 1.5*NVM | 48 |
| XXL(200%) | 2.0*NVM | 64 |

In some embodiments, the number of instances of each application can vary dynamically with the number of VMs. Whenever a VM is added or removed from the data center or cloud, the number of instances for each application is computed, and instances may be added or removed accordingly. The application profile provides the owner/administrator interface to define the application.

Some embodiments provides a default profile. The application owner is free to inherit or override one or more parameters of the default profile, but if the owner does not specify a parameter, the default value is used. For example, in some embodiments, the default scale is 75%, meaning that an application using the default profile will have 0.75 times as many instances as the total number of VMs in the system at any given time.

The profile can also include application specific parameters. For example, Java virtual machine (JVM) parameters and program arguments. The system also offers other benefits with regard to Block IPs, ordering data center etc. For example, a common profile for all instances of an application provides the application owner method to quickly specify that all instances of an application are blocked from receiving communications from a particular IP address.

The profile defines the initial (first) scale of the application when the application is initially launched. A dynamic profile is computed dynamically after the application is launched to specify an updated scale for each application, based on current average loading, CPU utilization, or available memory.

Figure 4A:
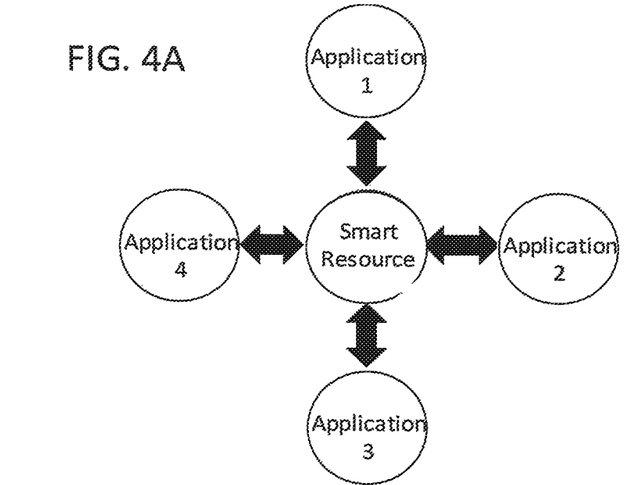
FIGS. 4A-4C illustrate exemplary assignments of a set of applications in accordance with some embodiments of the present disclosure.
Figure 4B:
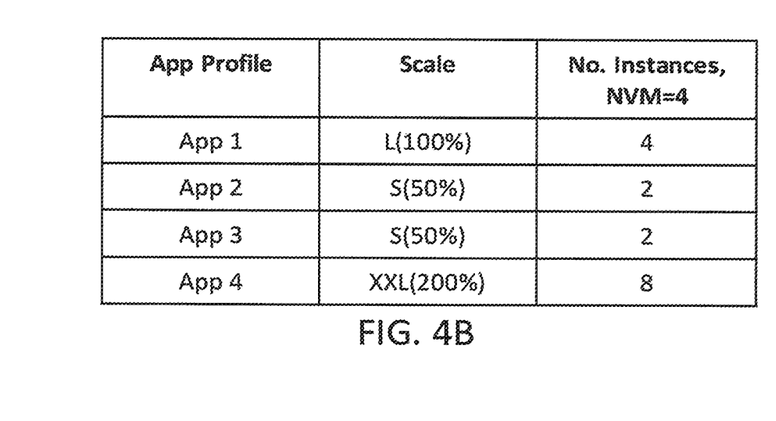
Figure 4C:
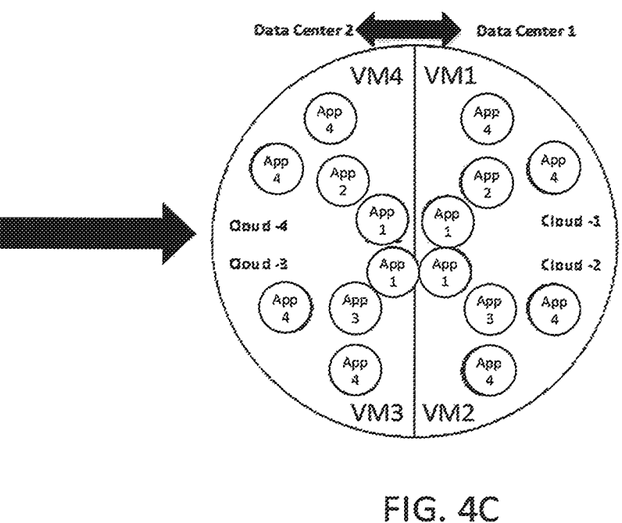

FIGS. 4A-4C schematically show another example showing assignment of a set of applications (Application 1 to Application 4) to a smart resource including two data centers, each having two clouds (Data center 1 includes cloud 1 and cloud 2, and Data center 2 includes cloud 3 and cloud 4). Each cloud has a single machine (bare metal or VM). FIG. 4A shows the applications to be assigned to the smart resource. FIG. 4B shows the scale of each application. Given one VM per cloud, NVM=4, FIG. 4B provides the number of instances of each application to be assigned among the four VMs. FIG. 4C shows the assignments of the instances in FIG. 4B to each VM. The instances of applications are distributed evenly among the VMs. The applications are arranged in order of scale. Using a round robin method, the instances of applications can be assigned in order of scale as follows:

TABLE 2

| Application | Instance | VM |
| --- | --- | --- |
| 4 | 1 | 1 |
| 4 | 2 | 2 |
| 4 | 3 | 3 |
| 4 | 4 | 4 |
| 4 | 5 | 1 |
| 4 | 6 | 2 |
| 4 | 7 | 3 |
| 4 | 8 | 4 |
| 1 | 1 | 1 |
| 1 | 2 | 2 |
| 1 | 3 | 3 |
| 1 | 4 | 4 |
| 2 | 1 | 1 |
| 2 | 2 | 2 |
| 3 | 1 | 3 |
| 3 | 2 | 4 |

The method described above distributes approximately the same number of instances of the application to each VM. The difference between the number of instances assigned to any two VMs (if those VMs have any instances) is not greater than one instance. In this example, one instance of application 1 is assigned to each VM; two instances of application 2 are assigned to each VM; and each VM either has zero or one instance of applications 3 and 4. As a result, each application is distributed evenly or approximately evenly among the available VMs in each cloud and each data center, improving reliability and balancing loading among existing available VMs without adding or removing any VMs to a cloud, and without changing the hardware configuration.

The application scale configuration can be implemented using a JSON as shown below. The distributor allows one configuration profile to define multiple smart resources. Application profile/job can be defined with its corresponding scale on each smart resource.

In the example of a JSON script below, each smart resource can be defined by a scale definition and a profile. The scale definition for an application includes the default scale applied to each application unless overridden, jobs/applications and overrides (individual scales for specific applications). The scale definition and profile can also include preferences relevant to reliability and quality of service, such as preference for hosting the application in a particular data center or in multiple data centers. The profile can specify the number of threads to be run and the memory profile.

For example, the "bedrockapp" application is defined as having a medium scale, except for specific individual overridesand as having several jobs, specified by name. The profile also provides a blocked IP address, preferred data center(s), and individual scale overrides for two of the applications. The "ebob" application provides default scale "L" for all applications unless individually overridden, a list of jobs, and an override of the scale for one of the applications.

```
{
"bedrockapp" : {
    "scale" : "M",
        "jobs" : ["cepEngine", "integrated_msg_listener", "kafka_integrated_msg_listener",
"kafka_inventory_processor", "kafka_logging_processor", "kafka_upe_all",
"kafka_upe_sfs", "kafka_upe_tracking", "kafka_index_processor", "kafka_upe_owned",
"kafka_upe_dsv", "kafka_upe_index", "kafka_upe_3pw", "kafka_upe_dsv_live",
"kafka_fulfillment_event_consumer"],
        "blockedIps":["10.0.99.999"],
        "dc_preference":["dc1","dc2"],
        "overrides" : {
                "cepEngine" : {
                        "scale" : "X2S"
                },
            "kafka_inventory_processor" : {
                    "scale" : "S"
                }
            }
},
"ebob" : {
    "scale" : "L",
        "jobs" : ["file_sweeper", "ftp_server", "sftp_server", "kafka_transport_processor_ebob",
"kafka_transport_processor_ebob_nff", "kafka_logging_processor", "webserver"],
        "overrides" : {
                "kafka_transport_processor_ebob" : {
                        "scale" : "XXL"
                }
            }
}
}
```

Each application also has an application profile. The profile is a representation of an application. Below is one sample where a java application is configured with JVM and configuration parameters. The profile is extensible to any other platform as well.

The application properties are defined in the "properties" section of the profile. These properties can include name, type, domain, classpath, start_class, thread_count, and program arguments. The application can be parameterized as well. In the example below, the JMX port is allocated dynamically with a dynamic sequence.

```
{
        "name": "kafka_integrated_msg_listener",
        "type": "integratedMsgListener",
        "domain": "XXX_DOMAIN",
        "classpath":
"com.walmart.bedrock.persistence.messaging.consumers.integrated.kafka.IntegratedKafka
ConsumerDaemon",
        "start_class":
"com.walmart.bedrock.transport.management.StartIntegratedKafkagListener",
        "thread_count": null,
        "properties": {
                "program.args_com.sun.management.jmxremote": "true",
```

```
            "program.args_com.sun.management.jmxremote.authenticate": "false",
            "program.args_com.sun.management.jmxremote.local.only": "false",
            "program.args_com.sun.management.jmxremote.port":
        "904@sequence@",
            "program.args_com.sun.management.jmxremote.ssl": "false"
        }
    }
```

Figure 5:
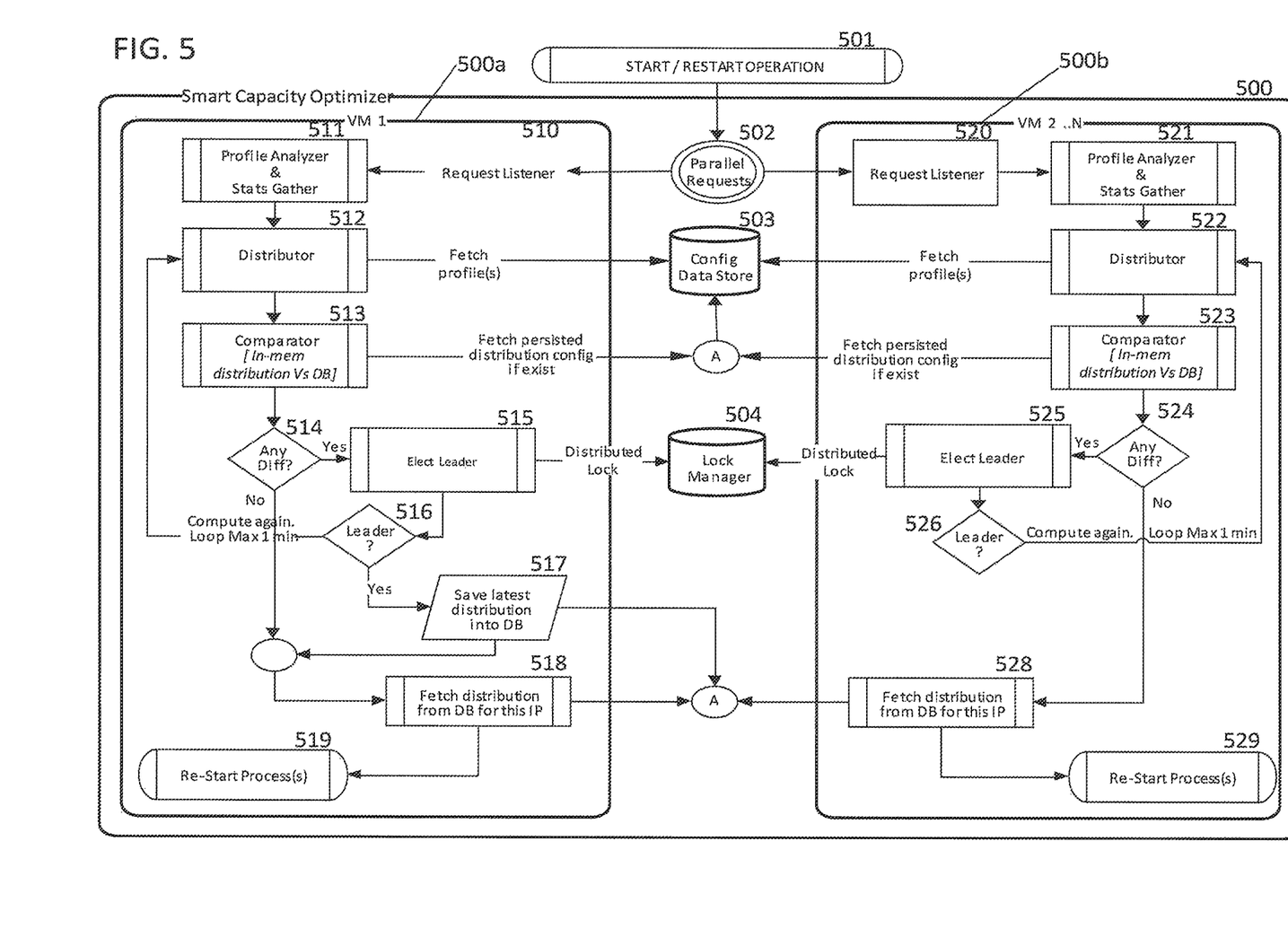
FIG. 5 illustrates a diagram of a method of assigning applications in accordance with some embodiments of the present disclosure.

FIG. 5 is a schematic diagram of a method of assigning applications (and instances of applications) to available cloud resources using a smart capacity optimizer (SCO) 500. In some embodiments, an instance of the SCO 500 executes asynchronously on each VM. Although FIG. 5 shows an example with two VMs (VM1 and VM2) and a respective instance of the SCO 500*a*, 500*b* for each VM, various systems can have any number of VMs, each with a corresponding instance of the SCO 500 running.

The SCO 500 also has a shared lock manager 504 in communication with the instances of SCO 500*a*, 500*b* in each VM. The lock manager 504 is capable of receiving requests from the SCO 500*a*, 500*b* for the lock manager 504 to elect the SCO 500*a*, 500*b* from which the request was received as the leader. The lock manager 504 elects one instance of the SCO 500*a*, 500*b* in one of the VMs as the leader, and the rest of the instances of the SCO 500 as followers. For example, the lock manager 504 can elect the first SCO 500*a* (to submit a request to be leader) as the leader. The lock manager 504 can also provide a lock on a database in the configuration data store 503 to the leader. While the leader has the lock, the leader has read/write access to the database, and the followers have read-only access to the database.

In some embodiments, the lock manager 504 can be implemented by a program such as Zookeeper, from Apache Software Foundation, Wakefield, Mass.

At block 501, the application is launched.

At block 502, the launcher sends a set of parallel requests 502 to each of the VMs in each cloud, in each data center. The requests initiate distribution of the application among the plurality of VMs and launching of one or more instances of the application in each VM to which the application is distributed.

At block 510 (520), a request listener in each SCO 500*a*, 500*b* processes the request as an interrupt.

At block 511 (521), the SCO analyzes the profile of each application and gathers statistics on each VM. The statistics can include load average (reflecting all applications on a machine), CPU utilization (reflecting each particular application), or total memory utilization (and/or total memory available). Block 511 (521) can apply one or more criteria based on load average, CPU utilization, or memory utilization to determine whether the VM is operating outside of ranges set forth in the profile (or default ranges set by the administrator).

Block 512 (522) is the distributor, which applies a distribution algorithm. Each virtual machine VM1, VM2 is configured to independently and asynchronously execute an instance of the distributor 512 (522). This improves the reliability of the system, because each distributor 512 (522) is constantly running as a "hot spare" and is capable of immediately being elected leader by the lock manager 504 if, for any reason, the previous leader fails to respond to any communication from the lock manager 504.

The distributor 512 (522) is configured for accessing a profile of the application and the current distribution of the application. To launch a given application, the distributor 512 (522) computes an initial distribution comprising a respective first number of instances of the given application to execute in each respective virtual machine based on the scale of the application (as defined in the application's initial (default) profile) and the initial configuration of VMs, clouds, and data centers in the system. After launch of a given application, the distributor 512 (522) computes an updated distribution comprising a respective second number of instances of the given application to execute in each respective virtual machine based on the scale of the application (as defined in the application's dynamic profile) and the current configuration of VMs, clouds, and data centers in the system.

Block 513 (523) compares the distribution computed by block 512 (522) with the distribution currently stored in the database of configuration data store 503.

After launch Block 514 (524) determines whether the second number of instances (just computed by the distributor 512) is different from a first number of instances (currently stored in the configuration data store 503). At block 514 (524), if the configurations are the same (no difference) execution passes to block 518 (528). If the configurations are different, then execution passes to block 515 (525).

Block 515 (525) sends a request from SCO 501*a* (501*b*) asking the lock manager 504 to elect the requesting SCO 501*a* (501*b*) in the requesting VM as the leader (sends an "election request"). The lock manager 504 periodically (e.g., once every minute) polls the current leader (if any). If the current leader responds to the poll, the lock manager 504 denies the election request by letting the lock remain with the current leader. If the current leader does not respond to the poll, the lock manager 504 grants the request and provides the lock to the requesting SCO 501*a* (501*b*) in the requesting VM.

At block 516 (526), if the requesting SCO 501*a* (501*b*) receives the lock, execution proceeds to block 517 (527). If the requesting SCO 501*a* (501*b*) does not receive the lock, execution returns to block 512 (522)

At block 517 (527), the SCO 501*a* (501*b*), which has been elected leader and given the lock, saves the distribution just computed by the distributor 512 (522) to the database in the configuration data store 503, in response to receiving a lock for accessing the distribution. The updated distribution is now accessible in configuration data store 503 for reading by all of the follower instances of the SCO 500. Each virtual machine is configured for releasing the lock after receiving the lock and storing the updated distribution in the database.

At block 518 (528), the SCO 501*a* (501*b*) fetches the distribution from the database in the configuration data store 503.

At block 519 (529), the SCO 501*a* (501*b*) restarts the number of instances of the application for its VM.

Figure 6:
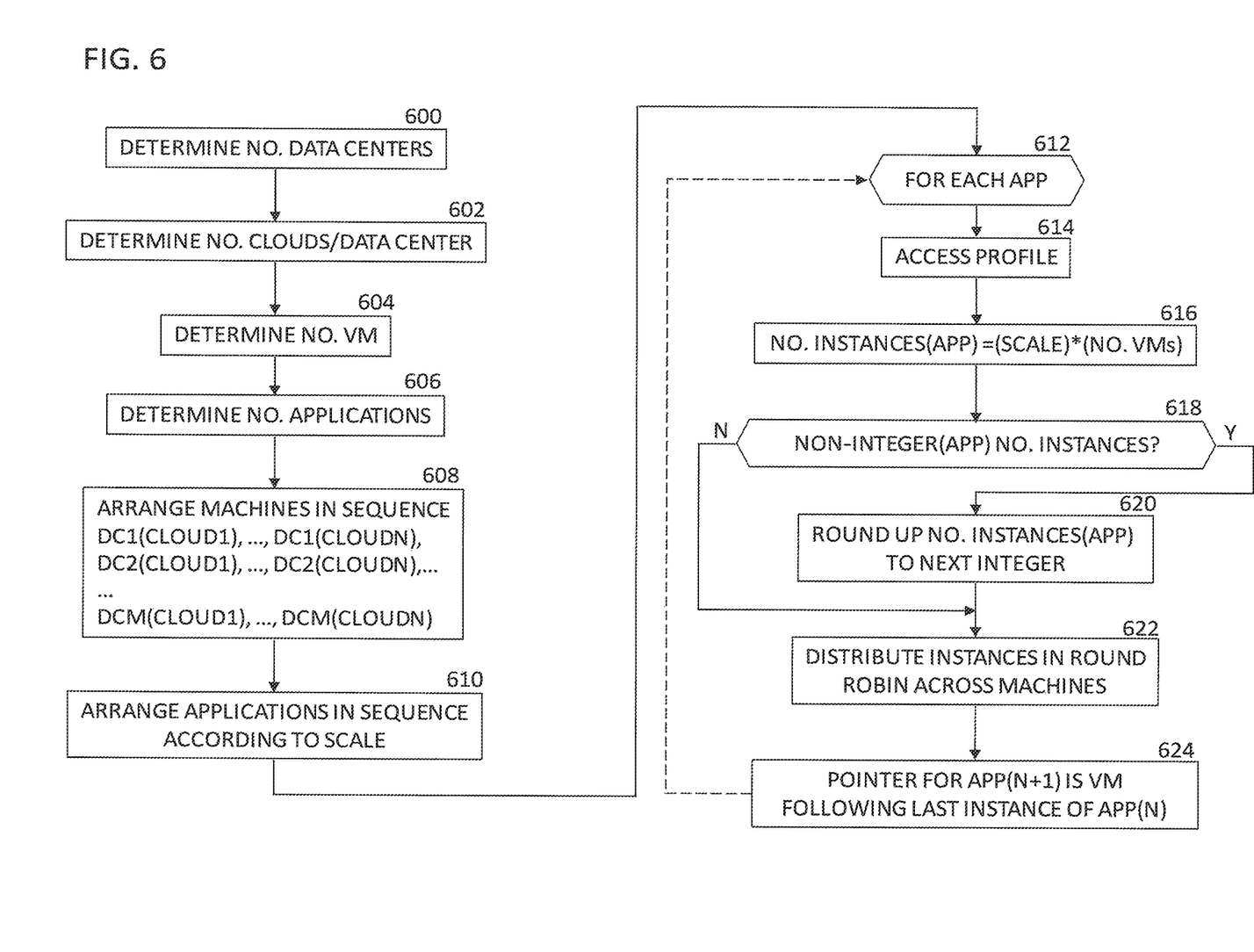
FIG. 6 illustrates an exemplary flow chart of a distributor block shown in FIG. 5, in accordance with some embodiments of the present disclosure.

FIG. 6 is a flow chart of the distributor block 512, 522 of FIG. 5.

In block 600, the distributor determines a number of data centers in the system.

In block 602, the distributor determines a number of clouds configured in each data center.

In block 604, the distributor determines a total number of virtual machines available, accounting for the respective number of VMs in each respective cloud. The distributor can dynamically picks up the number of VMs from the data centers and clouds.

In block 606, the distributor determines the number of applications.

At block 608, the distributor arranges the machine(s) in sequence starting from first data center to the $M^{th}$ DC available. The clouds within each data center are arranged in sequence, and the machines within each cloud are arranged in sequence.

At block 610, the applications to be distributed are arranged in sequence according to scale, either from highest to lowest, or from lowest to highest. For example, the applications can be arranged in the order XXL, XL, L, M, S, XS and X2S.

At block 612, a loop is performed for each application to be assigned. The loop includes blocks 614-624.

Block 614 accesses the profile of each application.

Block 616 determines the number of instances of the application as the product of the scale and the total number of VMs.

Block 618 determines whether the number of instances computed in block 616 is an integer or fractional number. If the computed number of instances is not an integer, execution passes to block 620. If the computed number of instances is an integer, execution skips block 620 and passes to block 622.

Block 620 rounds up the fractional number of instances to the next highest integer.

Block 622 distributes the instances of the application in a round robin fashion across the plurality of machines. Details of Block 622 are provided in FIG. 7, discussed below.

Block 624 sets a pointer for the next application, APP (N+1) to the VM following the VM to which the last instance of the current application APP(N) is distributed. This ensures that the total number of instances of all applications distributed the same are approximately the same, and the instances of applications are assigned evenly among all of the available machines.

Figure 7:
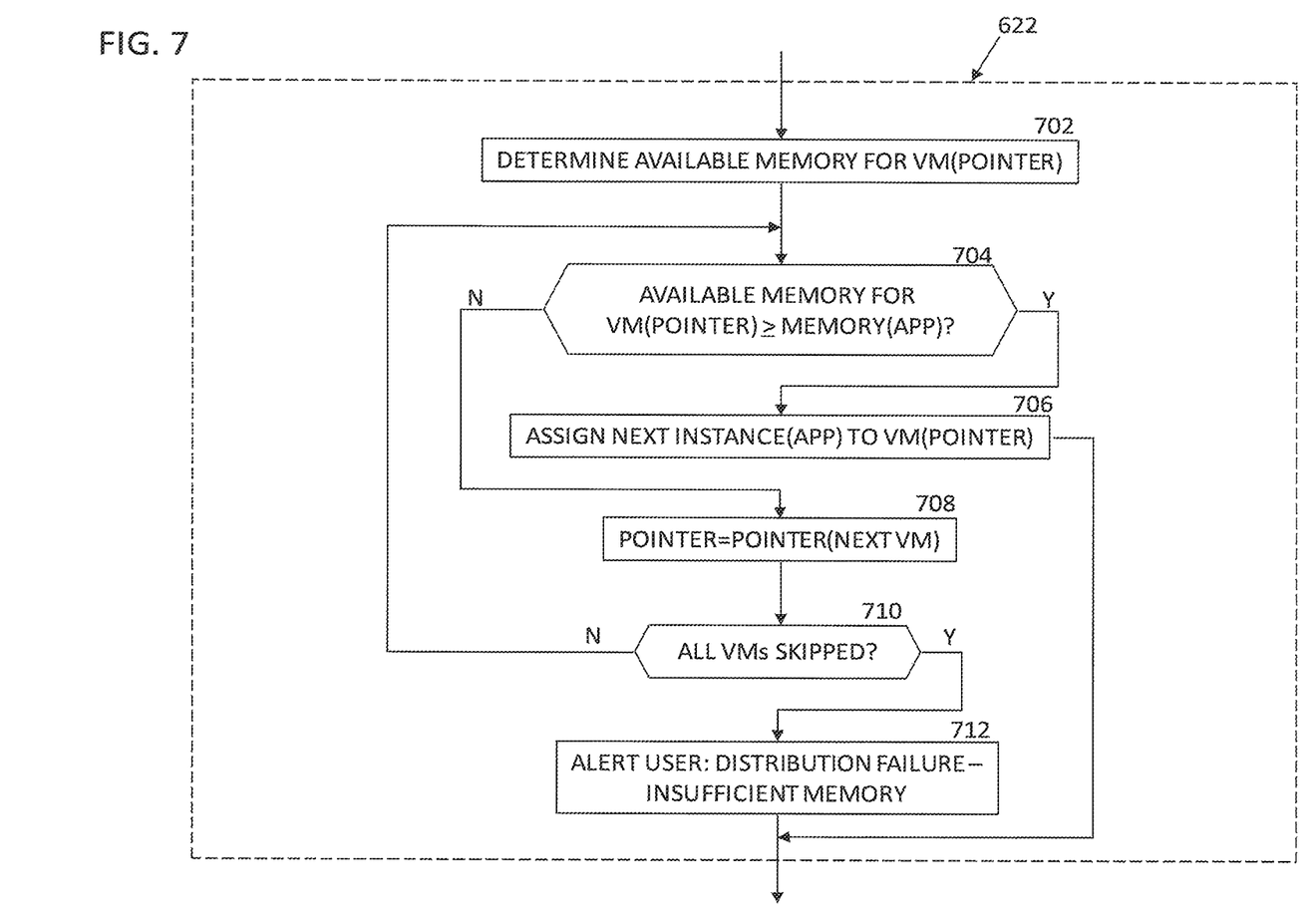
FIG. 7 illustrates an exemplary flow chart of a round robin method of a block shown in FIG. 6 in accordance with some embodiments of the present disclosure.

FIG. 7 is a detailed flow chart of the round robin method of block 622 (FIG. 6).

Block 702 determines the available memory for the next VM to which the pointer of block 624 points.

Block 704 determines whether the available memory for the next VM is greater than or equal to the memory used by the application being distributed. If the available memory is greater than or equal to the memory specified for application, execution passes to block 706. If the available memory is less than the memory specified for the application, execution passes to block 708.

At block 706, since the VM (to which the pointer points) has sufficient memory to host another instance of the application, the instance of the application is assigned to that VM. Execution then passes to block 624 (FIG. 6).

At block 708, since the VM (to which the pointer points) does not have sufficient memory to host another instance of the application, that VM is skipped, and the pointer is set to the next available VM.

Block 710 determines whether all of the VMs have been skipped. If all of the VMs have been skipped (i.e., none of the VMs has available memory for another instance of the application), control passes to block 712. If fewer than all of the VMs have been skipped for distributing this instance of the application, control returns to block 704. The loop of blocks 704 to 710 is then repeated check whether the following VM has sufficient memory.

At block 712, the distributor alerts the user and indicates that there is a distribution failure, and there is insufficient memory for the current scale setting of this application. The user can consider lowering the scale of this application, adding one or more VM, or other change.

Figure 8:
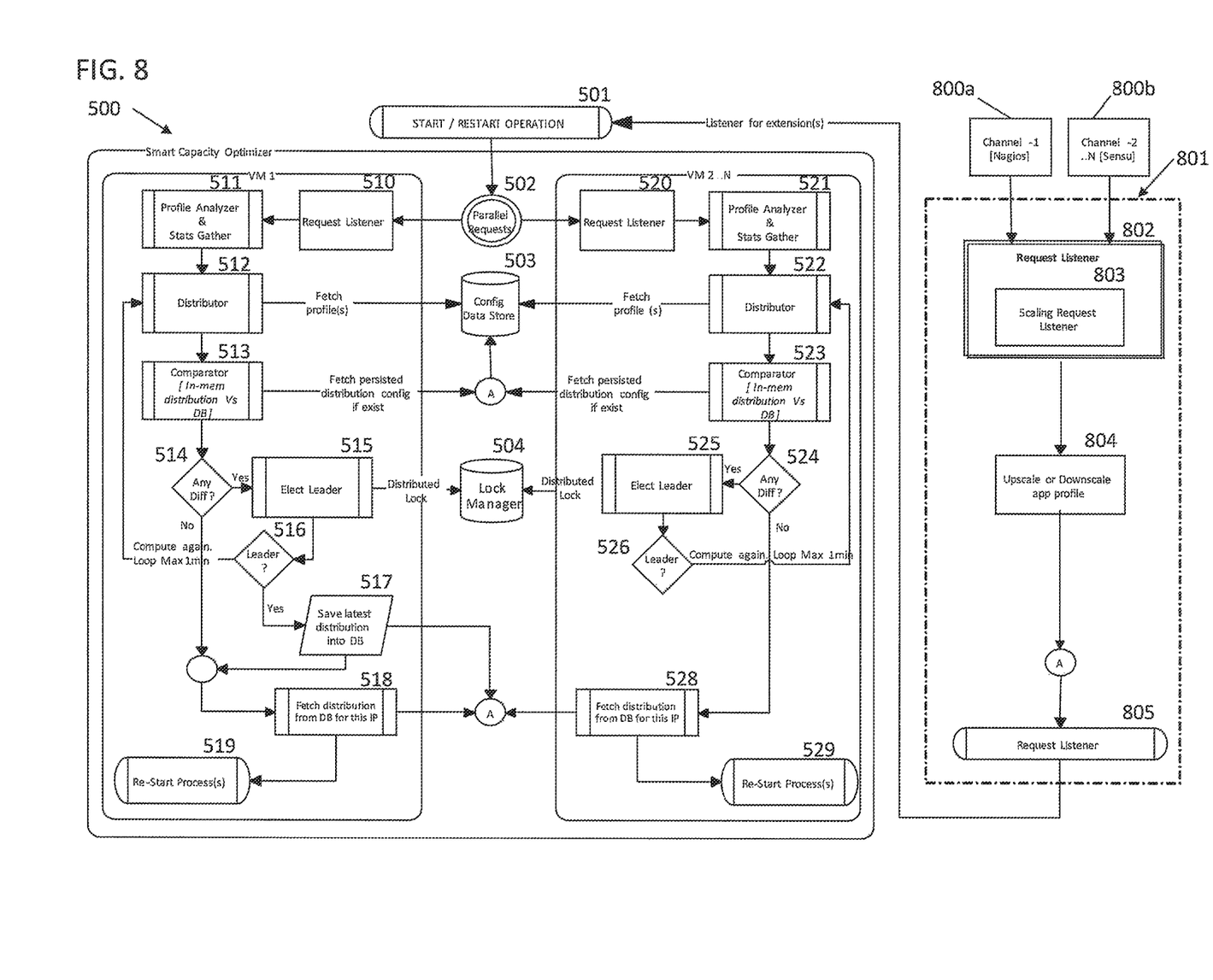
FIG. 8 illustrates an exemplary system configured to dynamically change the profile of one or more of applications in accordance with some embodiments of the present disclosure.

FIG. 8 shows an embodiment of the system configured to dynamically change the profile of one or more of the applications. The system includes the same SCO 500 described above, and the discussion of the SCO 500 is not repeated, solely for brevity. Like reference numerals in FIGS. 5 and 8 indicate the same items.

The system of FIG. 8 further comprises a scale controller 801 for increasing or decreasing the scale of one of the plurality of applications, in response to a usage metric of one or more of the plurality of virtual machines exceeding a predetermined threshold.

The scale controller 801 receives one or more metrics from respective channels 800a, 800b associated with each respective application. A request listener 802 is responsive to interrupts from any of the channels. A scaling request listener 803 is responsive to any event or condition that is relevant to increasing or decreasing the scale of one of the applications. For example, a scale change may be appropriate any time a VM is added or deleted in the system, or any time a user changes an application profile. Block 804 upscales or downscales the application profile. If the request is to upscale, then block 804 increases the scale of the corresponding application to the next larger scale. If the request is to downscale, then block 804 decreases the scale of the corresponding application to the next smaller scale. Block 804 saves any change to the dynamic profile in the configuration data store 503. Block 805 passes execution to the request listener 510 (520), initiating the SCO 500 in each of the VMs. Thus, the configuration data store 503 retains a copy of the initial profile and any updates are made to the dynamic profile.

As described herein, the system provides dynamic distribution of instances of each application. The SCO 500 optimizes resources in real time to distribute application(s). The SCO 500 ensures the distribution is balanced across the data centers and cloud machines. The SCO 500 provides a unified distribution method. The SCO 500 can drive and handle application instances in real-time. SCO 50 balances resource utilization among existing VMs, without disturbing other application(s) collocated in or out of s-resource. SCO 50 can distribute new instances without requiring additional VMs. SCO 500 can auto-scale applications, and satisfy application scale at any given time by increasing or decreasing the number of application instances. SCO 500 is extensible for various system metrics (machine or application). For example, SCO 500 can use criteria based on CPU load, CPU utilization, Memory utilization, etc. The SCO 500 is independent of platform. It can work with cloud machines, bare metal, etc. Also, SCO 500 is independent of application type or operating system. SCO Profiles permit simplified user experience as a domain-specific-language to the application owners. The profile is defined once per application. This may reduce or eliminate maintenance and allow application portability among a plurality of environments.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A system comprising:
   at least one processor configured to host a lock manager and a plurality of virtual machines in a cloud, each virtual machine configured to execute a plurality of instances of a first application, each virtual machine configured to communicate with the lock manager, the lock manager configured for:
   receiving a first request from a first virtual machine of the plurality of virtual machines to be a leader;
   transmitting to the first virtual machine, in response to the first request, a lock for a database, wherein the database stores:
   a profile of the first application that includes a scaling factor; and
   a distribution of the first application that identifies a respective first number of instances of the first application to execute in each respective virtual machine based on a number of the plurality of virtual machines in the cloud and the scaling factor;
   after launch of the first application, receiving a second request from a second virtual machine of the plurality of virtual machines to be the leader;
   determining whether the first virtual machine has responded to a poll;
   transmitting, to the second virtual machine, the lock for the database when the first virtual machine has not responded to the poll;
   obtaining a distribution from the database from a configuration data store; and
   restarting the first application.

2. The system of claim 1, wherein determining whether the first virtual machine has responded to the poll comprises periodically polling the first virtual machine, and determining whether the first virtual machine has responded to the periodic polling.

3. The system of claim 1, wherein the second request is received from the second virtual machine in response to the second virtual machine computing an updated distribution comprising a respective second number of instances of the first application to execute in each respective virtual machine.

4. The system of claim 3, wherein the second request is received from the second virtual machine in response to the second virtual machine determining that the second number of instances is different from the first number of instances.

5. The system of claim 1, wherein transmitting the lock for the database to the second virtual machine causes the second virtual machine to store an updated distribution in the database.

6. The system of claim 5, wherein the lock manager receives a release of the lock from the second virtual machine after the second virtual machine stores the updated distribution in the database.

7. The system of claim 1, wherein the lock allows the second virtual machine to update the distribution stored in the database.

8. The system of claim 1, wherein transmitting the lock for the database to the second virtual machine causes the second virtual machine to be the leader.

9. A method comprising:
   receiving a first request from a first virtual machine of a plurality of virtual machines to be a leader;
   transmitting to the first virtual machine, in response to the first request, a lock for a database, wherein the database stores:
   a profile of a first application that includes a scaling factor; and
   a distribution of the first application that identifies a respective first number of instances of the first application to execute in each respective virtual machine based on a number of the plurality of virtual machines and the scaling factor;
   after launch of the first application, receiving a second request from a second virtual machine of the plurality of virtual machines to be the leader;
   determining whether the first virtual machine has responded to a poll;
   transmitting, to the second virtual machine, the lock for the database when the first virtual machine has not responded to the poll;
   obtaining a distribution from the database from a configuration data store; and
   restarting the first application.

10. The method of claim 9, wherein determining whether the first virtual machine has responded to the poll comprises periodically polling the first virtual machine, and determining whether the first virtual machine has responded to the periodic polling.

11. The method of claim 9, wherein the second request is received from the second virtual machine in response to the second virtual machine computing an updated distribution comprising a respective second number of instances of the first application to execute in each respective virtual machine.

12. The method of claim 11, wherein the second request is received from the second virtual machine in response to the second virtual machine determining that the second number of instances is different from the first number of instances.

13. The method of claim 9, wherein transmitting the lock for the database to the second virtual machine causes the second virtual machine to store an updated distribution in the database.

14. The method of claim 13, comprising receiving a release of the lock from the second virtual machine after the second virtual machine stores the updated distribution in the database.

15. The method of claim 9, wherein transmitting the lock for the database to the second virtual machine causes the second virtual machine to be the leader.

16. A non-transitory, computer-readable storage medium comprising executable instructions that, when executed by one or more processors, cause the one or more processors to:
 receiving a first request from a first virtual machine of a plurality of virtual machines to be a leader;
 transmitting to the first virtual machine, in response to the first request, a lock for a database, wherein the database stores:
 a profile of a first application that includes a scaling factor; and
 a distribution of the first application that identifies a respective first number of instances of a first application to execute in each respective virtual machine based on a number of the plurality of virtual machines and the scaling factor;
 after launch of the first application, receiving a second request from a second virtual machine of the plurality of virtual machines to be the leader;
 determining whether the first virtual machine has responded to a poll;
 transmitting, to the second virtual machine, the lock for the database when the first virtual machine has not responded to the poll;
 obtaining a distribution from the database from a configuration data store; and
 restarting the first application.

17. The non-transitory, computer-readable storage medium of claim 16, wherein determining whether the first virtual machine has responded to the poll comprises periodically polling the first virtual machine, and determining whether the first virtual machine has responded to the periodic polling.

18. The non-transitory, computer-readable storage medium of claim 16, wherein the second request is received from the second virtual machine in response to the second virtual machine computing an updated distribution comprising a respective second number of instances of the first application to execute in each respective virtual machine.

19. The non-transitory, computer-readable storage medium of claim 18, wherein the second request is received from the second virtual machine in response to the second virtual machine determining that the second number of instances is different from the first number of instances.

20. The non-transitory, computer-readable storage medium of claim 16, comprising receiving a release of the lock from the second virtual machine after the second virtual machine stores an updated distribution in the database.

* * * * *